March 14, 1967
R. K. NICHOLS
3,308,628
CABLE LAYING ATTACHMENT FOR A SCRAPER VEHICLE
Filed Oct. 1, 1964
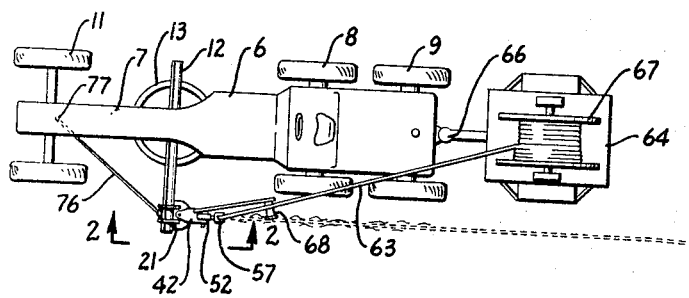
FIG. 1.
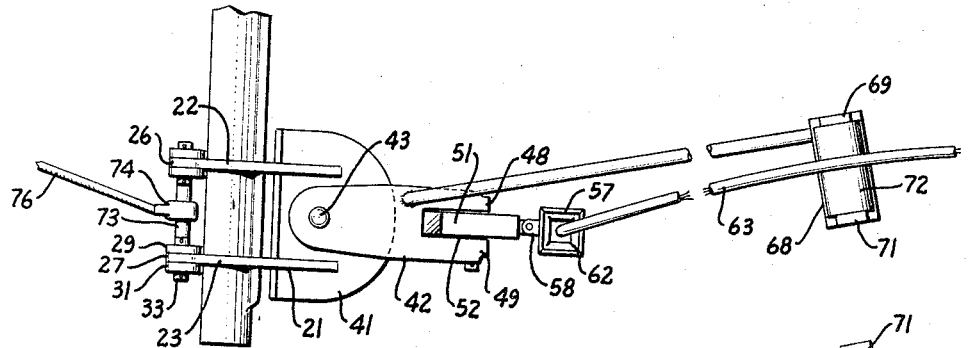
FIG. 3.
FIG. 2.
INVENTOR.
ROBERT K. NICHOLS
BY Lothrop & West
ATTORNEYS

United States Patent Office

3,308,628
Patented Mar. 14, 1967

3,308,628
CABLE LAYING ATTACHMENT FOR A SCRAPER VEHICLE
Robert K. Nichols, Los Gatos, Calif., assignor to Communications Construction & Excavating Company, Inc.
Filed Oct. 1, 1964, Ser. No. 400,738
1 Claim. (Cl. 61—72.6)

My invention is particularly useful in connection with the positioning of cable such as a power or communications cable beneath the surface of the ground by providing a relatively narrow trench below the ground surface into which the cable is fed and within which the cable remains.

An object of the invention is to provide means which can be attached to existing equipment such as a road grader or comparable blade device for extending the usefulness of that device to include the laying of cable.

Another object of the invention is to take advantage of the blade of a grader which can be substantially offset laterally from the center line of the grader to serve as a mounting for a cable laying attachment to place the cable within an offset trench formed along one side of the advancing structure.

Another object of the invention is to provide a cable laying attachment for a scraper vehicle which can be attached and detached without adversely affecting the scraper vehicle.

Another object of the invention is to provide a cable laying attachment for a scraper vehicle arranged to insure that the attachment is propelled without injury or damage to the scraper vehicle.

Another object of the invention is in general to provide an improved cable laying device and an improved cable laying attachment for a scraper vehicle.

Other objects together with the foregoing are attained in the embodiment of the invention described in the accompanying description and illustrated in the accompanying drawings, in which FIGURE 1 is a plan partially in diagrammatic form showing a cable laying attachment and a scraper vehicle in process of laying a cable.

FIGURE 2 is a side elevation of a scraper vehicle blade together with the cable laying attachment secured thereto.

FIGURE 3 is a plan of the structure shown in FIGURE 2.

In the preferred embodiment of the invention, although the arrangement is by no means limited thereto, it is preferred to utilize a road grader 6 as shown in FIGURE 1. Road grading devices are well-known and include a main frame 7 incorporating, a driving means for rotating at least the rear pairs of wheels 8 and 9 and also include means for steering at least the front pair of wheels 11. The grader carries a grading blade 12 mounted by appropriate mechanism on a ring 13 and under the control of the vehicle operator. The mounting is such that the blade cannot only assume any selected one of a number of rotary postions but can also be shifted laterally or transversely so as to occupy any one of a number of positions between one position centrally of the vehicle and symmetrical therewith and another laterally extended position, as shown in FIGURE 1. In the extreme, non-symmetrical position the blade extends laterally of the grader 6 to a point considerably beyond the track of the adjacent ground engaging wheels 8, 9 and 11. The blade 12 is usually straight across and of an arcuate form in elevation, as shown particularly in FIGURE 2, and is provided with a reinforcement 14 extending transversely thereof.

Pursuant to the invention there is mounted on the blade a frame 21 preferably comprised of metal shapes including a pair of plates 22 and 23 arranged parallel to each other and cut out in an arcuate fashion so that the plates closely abut or embrace the rearward face 24 of the arc of the blade 12. The shape of the frame plates 21 is such that they extend forwardly ahead of the top and bottom of the blade 12 and so constitute ears 26 and 27 which are perforated horizontally or transversely.

Designed to cooperate with the frame 21 and to serve as a means for holding the frame in place on the blade is an appropriate retaining means. This includes retainers 28 each comprised of a metal plate arcuate to abut the blade 12 and at its upper end carrying a pair of extensions 29 and 31. At the lower end each plate has similar extensions 32. Passing through the extensions 29 and 31 are securing pins 33 which when positioned ensure that the frame is tightly clamped to the transverse blade.

The frame 21 at its rearward portion incorporates a boxlike, rearwardly extending horizontal table 41 to which a bifurcated swinging arm 42 is connected by a vertical pivot pin 43. The arrangement is such that the swinging arm 42 can move from side to side about the axis of the pivot pin 43 and is additionally supported by resting and sliding upon the upper surface of the table 41. In this fashion the swinging arm can take an appropriate pivoted position depending upon the force exerted upon it.

Included in the trailing portion of the swinging arm is a pair of vertical pads 48 and 49 sufficiently spaced apart to embrace the bar portion 51 of a trenching tool generally designated 52. The bar portion includes a number of apertures 53 for receiving fastening pins 54 also passing through the pads 48 and 49 to secure the trenching tool at any desired elevation. The lower end of the trenching tool includes a digging member 56 in the form of a mole plow for establishing a generally circular cylindrical hole or trench in the ground.

To the rear of the bar 51 is disposed a cable guide 57 in the form of an upright tubular member having fastening lugs 58 secured in place by bolts 59. The lower end of the cable guide 57 terminates in a curved portion 61 facing rearwardly near the digging member 56. The upper portion of the cable guide has a bell mouth 62 for the reception of a cable 63. A cable cart 64 is disposed at the rear of the grader and is fastened thereto by a connection 66 for advancement over the ground with the road grader in any appropriate direction. A cable reel 67 rotatably mounted on the cart 64 supplies the cable 63 to the cable guide 57. Conveniently, a cable rest 68 is at its lower end secured to the swinging arm 42 and its upper end carries a pair of guide blocks 69 and 71 between which a roller 72 is disposed for freely guiding and supporting the cable.

In the operation of the device there is a substantial strain on the transverse blade 12 tending to rotate or twist the blade about its mounting on the road grader or scraper vehicle 6. For that reason the lower extensions 32 are preferably provided with a single through pin 73 (FIGURE 3) to which a cable fastener 74 is secured. A cable or towing device 76 is fastened to the fastener 74 at its rearward end and its forward end is fastened at a convenient point 77 (FIGURE 1) on the scraper vehicle frame.

For the laying of cable the machinery is arranged as indicated and the grader vehicle 6 is advanced over the road. The mole plow provides a tunnel beneath the surface of the ground being advanced largely by pull transmitted through the cable 76. The advance is smooth even though the mole plow is substantially to one side of the vehicle. The cable is fed from the rear through the cable guide 57 and having initially been fastened in the ground at a stationary point pays out through the discharge opening 61 in the tunnel provided by the mole plow. The cable attachment, being usually affixed near one end of the transversely extending blade 12, is effective to lay the cable in its trench or ditch at one side of the roadway on which the scraper vehicle advances and is so positioned as to lay the cable in or very close to an adjacent bank or cut.

The trench or tunnel is separately covered over. When no more cable laying is to be done, the attachment is removed and the grader and the blade are suitable for regular use; in fact, for grading over the trench or tunnel. In some cases, especially if there is adequate space at the sides, the attachment is mounted near the center of the blade and the cable is laid near the center of the grader vehicle. This reduces side strain but is somewhat less convenient to observe. The adjustments usually found on a road grader can be used for varying the position of the blade and so of the attachment.

What is claimed is:

A cable laying attachment for a scraper vehicle having a scraper blade comprising:

(a) a frame adapted to abut the rearward portion of said blade and to extend beyond the forward portion of said blade to provide a pair of spaced upper and lower apertured ears;

(b) a retainer having a convex surface directed toward said frame to abut said forward portion of said blade and terminating in upper and lower apertured ends overlying said ears;

(c) pins passing through said apertured ears and said apertured ends;

(d) a horizontal table on and extending rearwardly from said frame;

(e) a swinging arm having bifurcations extending above and below said table;

(f) a pivot pin passing through said bifurcations and said table;

(g) a trenching tool having an upright bar terminating at the lower end in a digging member;

(h) means for securing said bar on said arm;

(i) means on said bar for guiding a cable to a point near said digging member; and, (j) towing means secured to said frame and to said scraper vehicle.

References Cited by the Examiner

UNITED STATES PATENTS

| | | | |
|---|---|---|---|
| 2,036,598 | 4/1936 | Miller et al. | 37—145 X |
| 2,726,463 | 12/1955 | Rogers | 37—145 X |
| 2,837,844 | 6/1958 | Launder | 37—145 |
| 2,885,802 | 5/1959 | Eskridge | 37—145 |
| 3,060,696 | 10/1962 | Lang | 61—72.6 |
| 3,140,745 | 7/1964 | Hinkle et al. | 37—193 X |
| 3,140,898 | 7/1964 | Rogers | 37—145 X |

EARL J. WITMER, *Primary Examiner.*